United States Patent
Visen et al.

(10) Patent No.: US 12,034,738 B2
(45) Date of Patent: Jul. 9, 2024

(54) SECURING BORDER GATEWAY PROTOCOL ROUTE PROPAGATION AND UPDATING

(71) Applicant: T-Mobile Innovations LLC, Overland Park, KS (US)

(72) Inventors: Anubhav Visen, Overland Park, KS (US); Abhishek Bhargava, Spring, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 227 days.

(21) Appl. No.: 17/566,970

(22) Filed: Dec. 31, 2021

(65) Prior Publication Data

US 2023/0216863 A1    Jul. 6, 2023

(51) Int. Cl.
| | |
|---|---|
| *H04L 9/40* | (2022.01) |
| *H04L 9/32* | (2006.01) |
| *H04L 45/00* | (2022.01) |
| *H04L 45/02* | (2022.01) |

(52) U.S. Cl.
CPC ............ *H04L 63/12* (2013.01); *H04L 9/3247* (2013.01); *H04L 9/3263* (2013.01); *H04L 45/04* (2013.01); *H04L 45/20* (2013.01)

(58) Field of Classification Search
CPC ..... H04L 63/12; H04L 9/3247; H04L 9/3263; H04L 45/04; H04L 45/20; H04L 63/0823; H04L 63/126; H04L 9/3249; H04L 9/3255; H04L 9/3257; H04L 9/40
See application file for complete search history.

(56) References Cited

U.S. PATENT DOCUMENTS

| | | | |
|---|---|---|---|
| 2015/0207728 A1* | 7/2015 | Gagliano | ................ H04L 41/12 370/254 |
| 2023/0054738 A1* | 2/2023 | Agrawal | ............... H04L 9/3268 |

* cited by examiner

*Primary Examiner* — Quazi Farooqui
(74) *Attorney, Agent, or Firm* — Shook, Hardy & Bacon L.L.P.

(57) ABSTRACT

Embodiments of the present invention provide systems, methods, and computer storage media directed to propagating and authenticating border gateway protocol route advertisements. A trusted authority device stores and distributes routing information for various autonomous systems. The trusted authority device also issues and maintains digital certificates that are each assigned to one of the autonomous systems. The digital certificate can be utilized by autonomous systems to verify the authenticity of routing information advertised by another autonomous system. Each autonomous system can employ a routing device that can generate a route advertisement based on routing information received from the trusted authority device. The route advertisement can include a digital signature, a digital certificate, and a time-to-live value, among other things, each of which can be utilized by routing devices of other autonomous systems to determine the authenticity and validity of received routing information.

18 Claims, 7 Drawing Sheets

SECURING BORDER GATEWAY PROTOCOL ROUTE PROPAGATION AND UPDATING

SUMMARY

Embodiments of the present invention relate to securing the border gateway protocol (BGP), and particularly for facilitating the authentication of BGP route advertisements between autonomous systems. In current implementations of the BGP, there is an inherent trust between autonomous systems when routes are advertised over the Internet. In other words, there is currently no means for a receiving device (e.g., a border router) of an autonomous system to verify whether a route (e.g., IP prefix) advertised by an external party (i.e., a different autonomous system) is in fact advertised by the true owner of the advertised route. As this vulnerability could allow malicious entities to spoof route advertisements that potentially lead to a data breach or loss of confidential information, embodiments described herein relate to various systems and techniques for securing BGP propagation and updating.

According to one aspect of the present disclosure, a server or computing device associated with a trusted entity, such as the Internet Assigned Numbers Authority (IANA), is accessible (e.g., by computing devices of autonomous systems) as a trusted authority (e.g., a single source of truth). The server is responsible for tracking and storing BGP autonomous system numbers (ASNs) associated with different entities and IP addresses, among other things. In some embodiments, the trusted entity computing device provides to an entity (e.g., an AS with an ASN) with a digital signature that the entity can advertise to the Internet with its assigned route. In some other embodiments, the trusted entity computing device provides the entity, or other entities, a digital certificate associated with the digital signature, so that the advertised route and digital signature can be authenticated therewith. In some additional embodiments, the server can define a time-to-live (TTL) value in association with an autonomous system's IP addresses, ASNs, digital certificates, and other associated information, to ensure that the information is refreshed or otherwise updated periodically.

According to another aspect of the present disclosure, a routing device associated with an autonomous system (e.g., an ISP or corporation) can obtain routing information from a server or computing device associated with a trusted entity, such as the IANA. In some embodiments, the routing device receives, with or in association with the routing information, a digital signature that is specifically assigned to the autonomous system by the trusted entity. The digital signature can be generated based on the routing information associated with the autonomous system, among other things. In some other embodiments, the routing device can generate the digital signature based on a digital certificate, among other things, received from the trusted entity. Like conventional systems, the routing device can generate a route advertisement that includes its routing information, such as the ASN associated with the autonomous system. To provide a means for other entities to authenticate the routing information, however, in some embodiments the routing device generates the routing advertisement including the routing information, the digital signature for the routing information, and the digital certificate. In this way, recipients of the routing advertisement can employ the digital certificate to verify that the routing information is authentic. After authenticating the routing information, the routing device can update its routing table and/or store the routing information in memory.

According to yet another aspect of the present disclosure, a caching server associated with an autonomous system (e.g., an ISP or corporation) can establish a communications session with a server or computing device associated with a trusted entity, such as the Internet Assigned Numbers Authority (IANA). The caching server can download and/or cache a variety of information from the trusted entity computing device, such as IP addresses or BGP autonomous system numbers (ASNs) associated with different entities (i.e., autonomous systems). The caching server can also download and/or cache digital certificates assigned to the different autonomous systems by the trusted entity. In this way, when one or more computing devices of an autonomous system receives a routing advertisement from a computing device of another autonomous system, the routing advertisement can be authenticated with the corresponding digital certificate.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
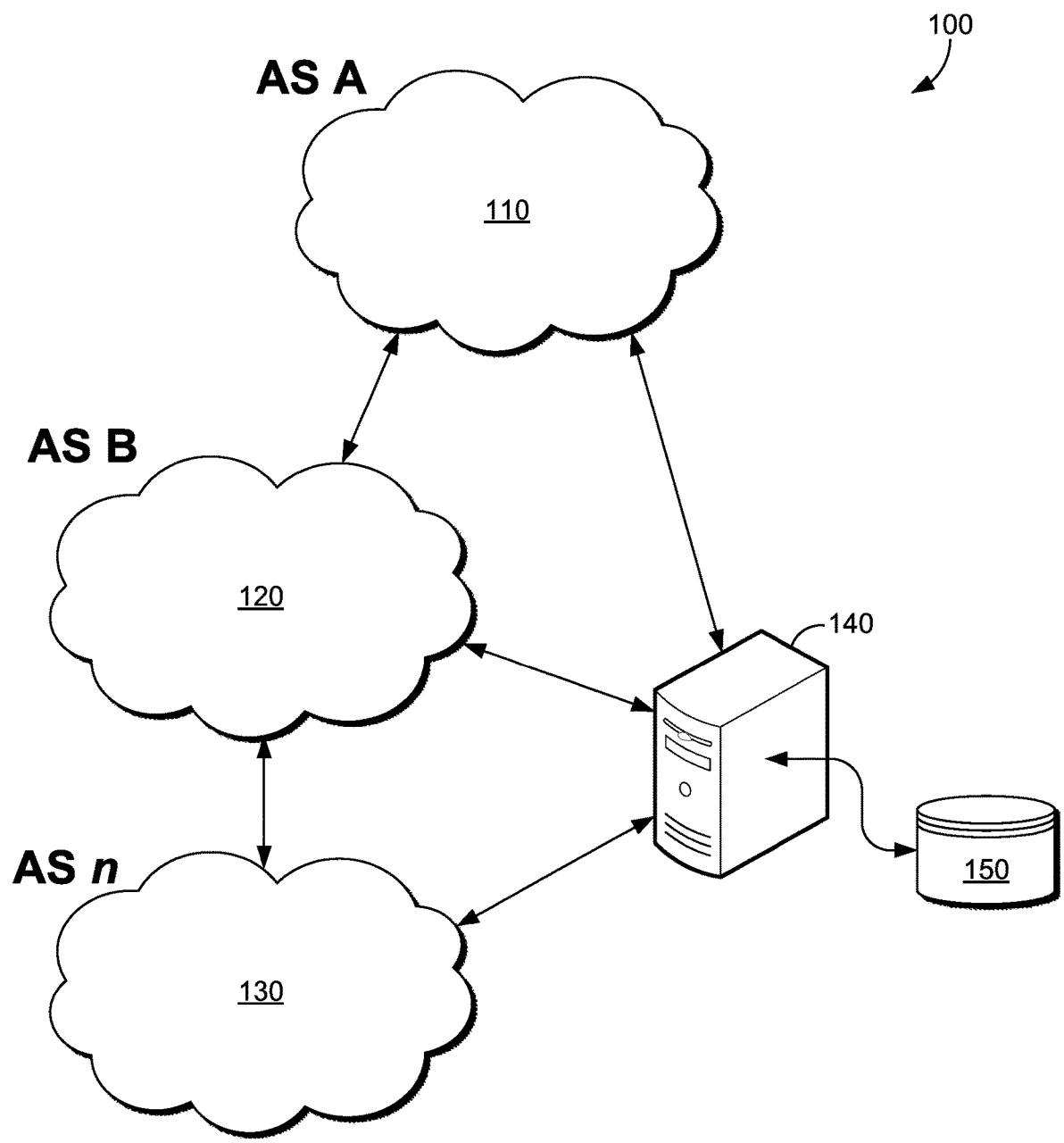
FIG. 1 is an exemplary operating environment of autonomous systems employing a secure border gateway protocol (BGP) in accordance with various embodiments of the present invention.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the Border Gateway Protocol (BGP) is a standardized gateway protocol that facilitates the exchange of routing information across autonomous systems (AS) on the Internet. Networks or autonomous systems that need to interact with one another over the Internet do so through peering, which is made possible with BGP. When a network router is connected to other networks, the router alone cannot determine which network is the best network to send its data to. BGP considers all peering partners, and sends traffic to the router that is closest to the data's destination. The communication is made possible because BGP enables peers to communicate their routing information to one another, thereby storing that information in a routing table (e.g., Routing Information Base (RIB)). As BGP was created in a time before cyber threats became more commonplace, the recent evolution and advancement of cyberattacks has made BGP vulnerable to abuse. BGP abuse is called "BGP hijacking," where rogue routers advertise routes (e.g., IP prefixes) that they do not own in order to maliciously draw traffic towards them. This security vulnerability, which could lead to data breaches and loss of confidential information, is possible because the protocol relies on an inherent trust in advertised routes. That is, an entity or autonomous system will advertise its routing information to its peers, and the routing information is simply accepted by its receiving peers as truthful. In order to solve this problem, the present disclosure is directed to systems, methods, and computer readable media that provides a means for securing BGP route propagation and updating. More specifically, disclosed embodiments relate to an implementation of one or more checks that make BGP route advertisements more secure.

According to one aspect of the present disclosure, a server or computing device associated with a trusted entity, such as the Internet Assigned Numbers Authority (IANA), is accessible (e.g., by computing devices of autonomous systems) as a trusted authority (e.g., a single source of truth). The server is responsible for tracking and storing BGP autonomous system numbers (ASNs) associated with different entities and IP addresses, among other things. In some embodiments, the trusted entity computing device provides to an entity (e.g., an AS with an ASN) with a digital signature that the entity can advertise to the Internet with its assigned route. In some other embodiments, the trusted entity computing device provides the entity, or other entities, a digital certificate associated with the digital signature, so that the advertised route and digital signature can be authenticated therewith. In some additional embodiments, the server can define a time-to-live (TTL) value in association with an autonomous system's IP addresses, ASNs, digital certificates, and other associated information, to ensure that the information is refreshed or otherwise updated periodically by autonomous systems.

According to another aspect of the present disclosure, a routing device associated with an autonomous system (e.g., an ISP or corporation) can obtain routing information from a server or computing device associated with a trusted entity, such as the IANA. In some embodiments, the routing device receives, with or in association with the routing information, a digital signature that is specifically assigned to the autonomous system by the trusted entity. The digital signature can be generated based on the routing information associated with the autonomous system, among other things. In some other embodiments, the routing device can generate the digital signature based on a digital certificate, among other things, received from the trusted entity. Like conventional systems, the routing device can generate a route advertisement that includes its routing information, such as the ASN associated with the autonomous system. To provide a means for other entities to authenticate the routing information, however, in some embodiments the routing device generates the routing advertisement including the routing information, the digital signature for the routing information, and the digital certificate. In this way, recipients of the routing advertisement can employ the digital certificate to verify that the routing information is authentic. After authenticating the routing information, the routing device can update its routing table and/or store the routing information in memory.

According to yet another aspect of the present disclosure, a caching server associated with an autonomous system (e.g., an ISP or corporation) can establish a communications session with a server or computing device associated with a trusted entity, such as the Internet Assigned Numbers Authority (IANA). The caching server can download and/or cache a variety of information from the trusted entity computing device, such as IP addresses or BGP autonomous system numbers (ASNs) associated with different entities (i.e., autonomous systems). The caching server can also download and/or cache digital certificates assigned to the different autonomous systems by the trusted entity. In this way, when one or more computing devices of an autonomous system receives a routing advertisement from a computing device of another autonomous system, the routing advertisement can be authenticated with the corresponding digital certificate.

Turning now to FIG. 1, a schematic depiction is provided illustrating an exemplary operating environment 100 of autonomous systems (AS) employing secure BGP, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 depicts at least two autonomous systems, AS A 110 and AS B 120, though any number of autonomous systems up to AS n 130 may be employed (where n is representative of any number, letter, or combination thereof). Any one of autonomous systems, AS A 110, AS B 120, or AS n 130 represents any number of computing devices (e.g., routers, servers), such as computing device 800 of FIG. 8, associated with an autonomous system number (ASN) of the autonomous system, and one or more of the computing devices of an autonomous system can communicate directly or indirectly with one or more computing devices (e.g., computing device 800 of FIG. 8) of another autonomous system. As one of ordinary skill may appreciate, an Autonomous System (AS) is generally known as a set of Internet routable IP prefixes belonging to a network or a collection of networks that are all managed, controlled and supervised by a single entity or organization.

BGP specifies a TCP-based communications method to help autonomous systems exchange routing information over the Internet. An AS is a collection of routers run by a common administration, such as a large enterprise or university, which control a range of IP addresses. Each AS is assigned an Autonomous System Number (ASN). BGP determines routing decisions based on paths, rules, and/or network policies set by a network administrator. Each AS manages a routing table that contains every known route to other networks, which is then shared with neighboring networks, also known as peers. The BGP decision process enables the AS to select the most efficient route available by analyzing the path attributes of each candidate, applying a set of criteria (including weight, local preference, shortest AS Path, etc.).

It is contemplated that for purposes of the present disclosure, any one of the autonomous systems AS A 110, AS B 120, and AS n 130 can also establish a communications session with a computing device (e.g., computing device 800 of FIG. 8) or server associated with a trusted entity, such as the IANA. The trusted entity computing device or server can include a secure BGP registry and certificate authority device 140, as depicted in FIG. 1. The secure BGP registry and certificate authority device 140 can include or be coupled to a data store 150, which can include a database or other data storage device. While the secure BGP registry and certificate authority device 140 is described herein as being associated with a trusted entity, like the IANA, it is also contemplated that the trusted entity need not necessarily be a centralized authority, but may be a trusted third party or even a decentralized authority, such as a decentralized autonomous organization (DAO).

In some embodiments, the secure BGP registry and certificate authority device 140 can define verifiable routing information associated with autonomous systems. For instance, the secure BGP registry and certificate authority device 140 can define public IPv4 and IPv6 addresses assigned (by the trusted entity) to a certain entity or organization. In addition, the secure BGP registry and certificate authority device 140 can define the BGP Autonomous System Number (ASN) also assigned (by the trusted entity) to each entity or organization, among other things. In some embodiments, the secure BGP registry and certificate authority device 140 can generate digital certificates that correspond to digital signatures associated with each of the autonomous systems. As will be described herein, a digital certificate can be employed by various autonomous systems to determine that a routing advertisement received from another autonomous system is authentic.

In various embodiments, the secure BGP registry and certificate authority device 140 can store, in data store 150, records that define and track the verifiable routing information associated with autonomous systems. For instance, the data store 150 can store the public IPv4 and IPv6 addresses assigned (by the trusted entity) to a certain entity or organization. In addition, the data store 150 can store a location of each entity or organization, as well as the BGP Autonomous System Number (ASN) also assigned (by the trusted entity) to each entity or organization, among other things. In some embodiments, the data store 150 can store the digital certificates that correspond to digital signatures associated with each of the autonomous systems. In this regard, if a computing device (e.g., a router) of an autonomous system generated a routing advertisement, the computing device could include a digital signature with the routing information sent to another computing device (e.g., another router) of another autonomous system, so that the other computing device could employ the corresponding digital certificate to authenticate the digitally-signed routing information as having originated from its true owner.

In some embodiments, an autonomous system, such as A 110, AS B 120, or AS n 130, can include one or more routing devices associated with an ASN and configured to: generate route advertisements including route information associated with the ASN, communicate the route advertisements to routing devices associated with another ASN, authenticate route information received from another ASN, and update a routing table based on authenticated route information received from another ASN. As will be described herein, a routing device of an autonomous system can be configured to generate verifiable routing advertisements, verify the authenticity of received routing advertisements, and update routing information based on determining the authenticity of received routing advertisements, among other things.

In some further embodiments, an autonomous system can include at least one secure BGP caching server that establishes a communications session with the secure BGP registry and certificate authority device 140. As will be described herein, a secure BGP caching server can request and receive, from the secure BGP registry and certificate authority device 140, any portion of verified AS information stored in data store 150. In this way, one or more computing devices of an autonomous system, such as a routing device of the autonomous system, can easily query the secure BGP caching server to authenticate routing information received from other computing devices, among other things.

Figure 2:
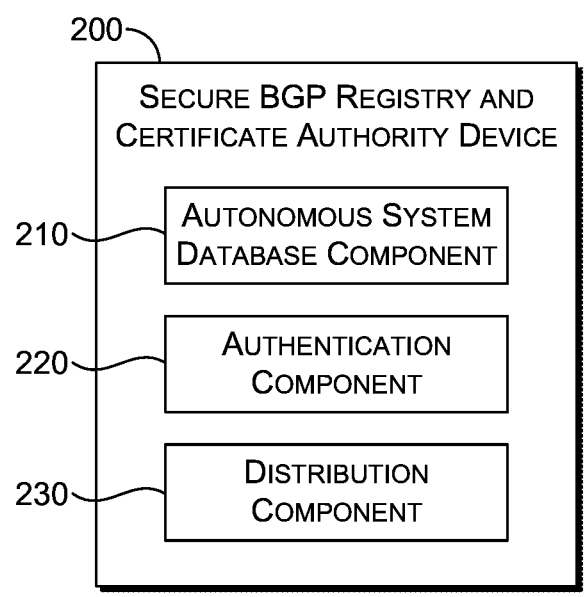
FIG. 2 is a block diagram illustrating a secure BGP registry and certificate authority device in accordance with some embodiments of the present invention.

Looking now to FIG. 2, a block diagram is illustrated, depicting a secure BGP registry and certificate authority device 200 in accordance with some embodiments of the present disclosure. As similarly described in accordance with the secure BGP registry and certificate authority device 140 of FIG. 1, the depicted secure BGP registry and certificate authority device 200 of FIG. 2 can include computing devices (e.g., computing device 800 of FIG. 8) and/or components associated with a trusted entity, such as the IANA or other trusted centralized or decentralized authority. In accordance with various embodiments, the role of the secure BGP registry and certificate authority device 200 is to define, store, and/or share verifiable autonomous system BGP information, such as a name of an entity or organization associated with an autonomous system, an autonomous system number (ASN) associated with the autonomous system, a set or range of IP addresses associated with the autonomous system, a location of the entity or organization, and/or a digital certificate that can be employed to authenticate a digitally-signed set of routing information received from the autonomous system, among other things. In some aspects, the secure BGP registry and certificate authority device 200 also serves as a certification authority that issues digital certificates to verified autonomous systems. In one aspect of the present disclosure, the secure BGP registry and certificate authority device 200 can include an autonomous system database component 210 that can interface with a data store, such as data store 150 of FIG. 1, to store any portion of the verifiable autonomous system BGP information defined, generated and/or obtained by the secure BGP registry and certificate authority device 200.

As described herein, embodiments facilitate processes where autonomous systems (or devices thereof) can digitally sign and authenticate routing information advertised there between. In some embodiments, the secure BGP registry and certificate authority device 200 includes an authentication component 220 that can generate a digital certificate for each autonomous system that is registered or otherwise tracked by the trusted authority. The digital certificate can include, among other things, a public key associated with the autonomous system, which can be employed by any autonomous system (or device thereof) to verify digitally-signed routing information received from an autonomous system associated with a private key, utilized by the advertising AS, to digitally sign the routing information. In some embodiments, an autonomous system (e.g., a router thereof) can send the trusted authority a public key that corresponds to a private key held by the autonomous system. Upon verifying that the autonomous system is in fact the entity or organization it claims to be, the trusted authority can both assign (e.g., via the secure BGP registry and certificate authority device 200) the autonomous system with an autonomous system number (ASN) and issue (e.g., via the authentication component 220) a digital certificate that can be employed to authenticate a digitally-signed version of the ASN.

In some other embodiments, the trusted authority (e.g., the authentication component 220) can generate and retain a private key for each autonomous system and generate a digital signature associated with the ASN assigned to the autonomous system. The digital signature, a corresponding digital certificate, and the assigned ASN can be provided to the autonomous system (e.g., a router thereof), so that the autonomous system can generate and advertise routing information that includes the digital signature, the digital certificate, and ASN, among other things. In this way, a receiving AS can receive the routing information, authenticate the digital signature and routing information with the digital certificate, and store the authenticated routing information.

In some other embodiments, the trusted authority (e.g., the authentication component 220) can generate and retain the public key for each autonomous system. As in other embodiments, an autonomous system can generate and advertise routing information that includes the digital signature and ASN, among other things. A receiving AS, however, can receive the routing information, access the secure BGP registry and certificate authority device 200 or a local caching server to retrieve the digital certificate therefrom, authenticate the digital signature and routing information with the digital certificate, and store the authenticated routing information as a result. In this way, the trusted authority (or caching servers thereof) can serve as a clearinghouse for public keys or digital certificates that may be utilized to authenticate or otherwise verify received route advertisements.

In some other embodiments, the trusted authority (e.g., the authentication component 220) can define a time-to-live (TTL) value associated with each set of routing information assigned to an autonomous system. The TTL value associated with a set of assigned routing information can be distributed, with associated routing information, to various devices or components of the described system to define a caching period in which routing information is deemed valid before a refresh or re-authentication of the routing information is recommended or required. As autonomous system numbers and routing information, generally, can change over time, the association of a TTL value with route information can ensure that autonomous systems maintain the most up-to-date and valid route information.

In another aspect of the present disclosure, the secure BGP registry and certificate authority device 200 can include a distribution component 230 that can be accessed by one or more computing devices via the Internet. In accordance with embodiments described herein, each autonomous system can include a secure BGP caching server that can establish a communications session with the distribution component 230 of the secure BGP registry and certificate authority device 200. The secure BGP caching server can download, from the secure BGP registry and certificate authority device 200 via its distribution component 230, any portion of the autonomous system information stored in its data store (e.g., data store 150 of FIG. 1).

Figure 3:
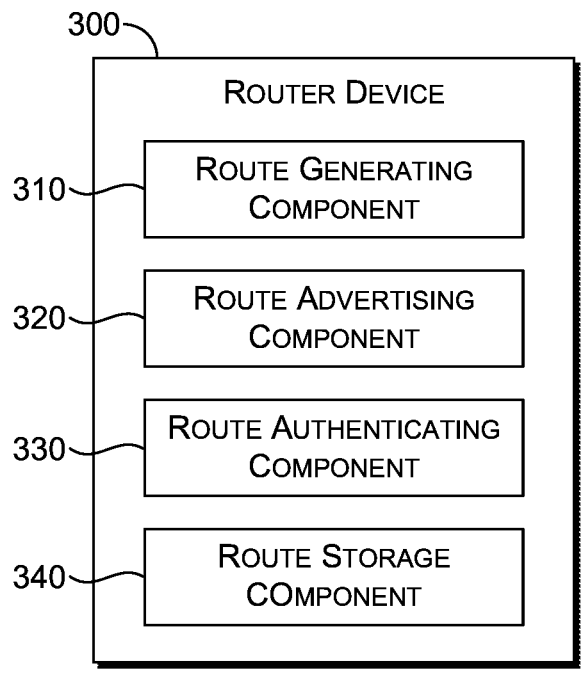
FIG. 3 is a block diagram illustrating a router device in accordance with some embodiments of the present invention.

Referring now to FIG. 3, a block diagram is illustrated, depicting a router device 300 in accordance with some embodiments of the present disclosure. As similarly described in accordance with one or more computing devices that may be included in an autonomous system (e.g., AS A 110, AS B 120, or AS n 130 of FIG. 1), the depicted router device 300 includes one or more computing devices (e.g., computing device 800 of FIG. 8) or components associated with the autonomous system and an autonomous number of the autonomous system. The router device 300 described herein can include, among other things, a border router or an edge router, as one of ordinary skill in the art may appreciate. In other words, a router device 300 of an autonomous system can be responsible for exchanging routing information with another autonomous system (i.e., a BGP peer). In accordance with the embodiments described herein, the router device 300 includes components that enable secured BGP propagation and updating, among other things.

In an aspect of the present disclosure, the router device 300 includes a route generating component 310 that can generate a route advertisement based on routing information received from a server or computing device of a trusted authority, such as a secure BGP registry and certificate authority device 200 of FIG. 2. The route generating component 310 can generate, among other things, a BGP route advertisement that includes route information associated with the autonomous system number of the autonomous system in which the router device 300 belongs. That is, the router device 300 can receive route information from a source of trusted routing information, like the secure BGP registry and certificate authority device 200 of FIG. 2 or a local caching server (e.g., secure BGP caching server 400 of FIG. 4 as will be described), and generate a route advertisement therefrom. In some embodiments, the route generating component 310 can include a digital signature, associated with the route information, into the generated route advertisement.

In some embodiments, the digital signature can be generated by the route generating component 310 of router device 300 based on a private key of the autonomous system (e.g., if the router device 300 retains a private key associated with the autonomous system) and the route information, among other things. While it is contemplated that a digital signature for the route advertisement can be generated in a variety of ways, in one example, the route generating component 310 can generate a hash of the route information, encrypt the hash with the private key, and package the public key (or digital certificate) associated with the private key together with the encrypted hash to generate the digital signature. In this way, the route generating component 310 can package together the digital signature with the route information to enable another autonomous system or device thereof to verify that the route advertisement originated from the autonomous system (or router device 300 thereof). In another embodiment, the router device 300 can receive, from the secure BGP registry and certificate authority device 200 of FIG. 2 or a local caching server, the digital signature associated with the route information in addition to the route information itself. Similarly, the route generating component 310 can package together the digital signature with the route information to enable another autonomous system or device thereof to verify that the route advertisement originated from the autonomous system (or router device 300 thereof).

In some further embodiments, the route generating component 310 can generate the BGP route advertisement further including a TTL value associated with route information. That is, as in other embodiments, the route generating component 310 can generate a route advertisement associated with the autonomous system number of the autonomous system in which the router device 300 belongs, and include therein the associated TTL value received from either the secure BGP registry and certificate authority device 200 of FIG. 2 or a local caching server. In this way, a receiving autonomous system (or device thereof), can utilize the TTL value to determine when the received routing information should be re-authenticated and/or updated, among other things.

In another aspect of the present disclosure, the router device 300 includes a route advertising component 320 that communicates a generated route advertisement, such as one generated by route generating component 310, to one or more autonomous systems or devices (e.g., router devices) thereof. As is performed in conventional BGP systems, the router device 300 can communicate its route advertisements to neighboring peers. However, in embodiments described herein, each neighboring peer can receive the route advertisement and authenticate the origin and veracity of the route advertisement before updating its routing tables or otherwise storing the received route advertisement, among other things.

In another aspect of the present disclosure, the router device 300 includes a route authenticating component 330 that can receive a route advertisement (e.g., from a neighboring peer) and determine whether the route advertisement is valid and actually originated from the autonomous system from which it claims to have originated. The route authenticating component 330 can receive the route advertisement and determine that the route advertisement includes routing information and a digital signature. In some embodiments, the route authenticating component 330 can unpack the digital signature and extract therefrom a digital certificate that was issued by a trusted authority, like the secure BGP registry and certificate authority device 200 of FIG. 2. In some other embodiments, the route authenticating component 330 can retrieve the associated digital certificate from the trusted authority (e.g., secure BGP registry and certificate authority device 200 of FIG. 2), or a local caching server that communicates with the trusted authority. It is contemplated that the digital certificate can be retrieved by providing the trusted authority with any portion of the received routing information (e.g., ASN) to receive the digital certificate associated therewith. In various embodiments, the route authenticating component 330 can employ the digital certificate to authenticate the received routing information. By way of non-limiting example, the route authenticating component 330 can receive the digital certificate, extract therefrom a public key, and employ the public key to decrypt an encrypted hash included in a digital signature received in the route advertisement. The route authenticating component 330 can employ a hashing algorithm to generate a hash of the route information, and compare the hashed routing information with the decrypted hash. A match between the hashed routing information and the decrypted hash can demonstrate that the received routing information was indeed digitally signed and advertised by the autonomous system in which the received routing information claims. As such, the route authenticating component 330 can determine that the hashed routing information and decrypted hash match, and further determine that the received routing advertisement is authentic. In some embodiments, the route authenticating component 330 can receive the route advertisement and determine that the route advertisement further includes a TTL value. If the route authenticating component 330 determines that the received routing advertisement is authentic, the route authenticating component 330 can initiate a timer (also referenced herein as a "counter") based on the included TTL value. In this way, an expiration of the timer for the received and authenticated routing advertisement can alert the router device to re-authenticate and/or update a received routing advertisement in association with the autonomous system from which the authenticated routing advertisement was received.

In some embodiments, the router device 300 of an autonomous system can receive a route advertisement from another autonomous system (e.g., a router device of the other autonomous system). The router device 300 may determine that the route advertisement does not have authentication information (e.g., digital signature, TTL) therein, or the authentication information may not be verified. In this case, the router device 300 can either reject the route advertisement, or may accept the route advertisement as unauthenticated routing information. In some further embodiments, the router device 300 can determine that the route advertisement does include authentication information and the route authenticating component 330 can verify that the route information is authentic, as described in accordance with route authenticating component 330. If the router device 300 determines that unauthenticated routing information for the other autonomous system does exist (e.g., is stored and/or listed in its routing table), the router device 300 can prefer the authenticated routing information and update or otherwise replace the unauthenticated routing information with the authenticated routing information.

In another aspect of the present disclosure, the router device 300 includes a route storage component 340 that can store received routing information, among other things, based on a determination by route authenticating component 330 that the routing information is authentic. That is, after the route authenticating component 330 determines that a received route advertisement is in fact from the autonomous system claiming to have advertised it, the route storage component 340 can store any portion of the authenticated route advertisement (e.g., route information, digital signature, digital certificate, TTL value) in memory. In various embodiments, the route storage component 340 can update its routing table(s) with the authenticated route information in association with the autonomous system and autonomous system number of the advertising autonomous system.

Figure 4:
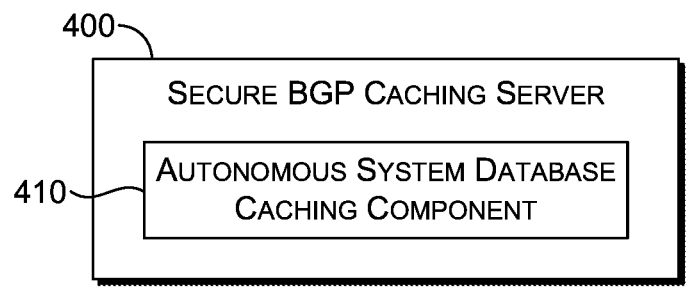
FIG. 4 is a block diagram illustrating a secure BGP caching server in accordance with some embodiments of the present invention.

Referring now to FIG. 4, a block diagram is illustrated, depicting a secure BGP caching server 400 in accordance with some embodiments of the present disclosure. As described in accordance with various embodiments of the present disclosure, an autonomous system (e.g., AS A 110, AS B 120, or AS n 130 of FIG. 1) can include a local caching server, like a secure BGP caching server 400, that can establish a communications session with a computing device of a trusted authority, like a secure BGP registry and certificate authority device 200 of FIG. 2. The secure BGP caching server 400 can interface with the secure BGP registry and certificate authority device 200 via its distribution component 230, and download any amount of information that may be stored thereby (e.g., in data store 150 of FIG. 1). That is, the secure BGP caching server 400 can include an autonomous system database caching component 410 that downloads and stores therein any combination of autonomous system names, autonomous system locations, ASNs, IP addresses, routes or other routing information, digital signatures, digital certificates, TTL values, and more. Each autonomous system can employ its local caching server to retrieve any amount of information necessary to authenticate or cross-check authentication data that may be necessary to verify received route advertisements. As autonomous systems may have security measures (e.g., firewalls) in place, it is contemplated that the secure BGP caching server 400 is behind such security measures and is generally accessible to one or more computing devices (e.g., routers) of the autonomous system, so that IP-level reachability is made readily available. In some embodiments, the autonomous system database caching component 410 can employ a TTL value associated with received routing information to determine when the routing information should be re-retrieved, refreshed, and otherwise re-authenticated by the secure BGP caching server 400 or a routing device, such as router device 300 of FIG. 3.

Figure 5:
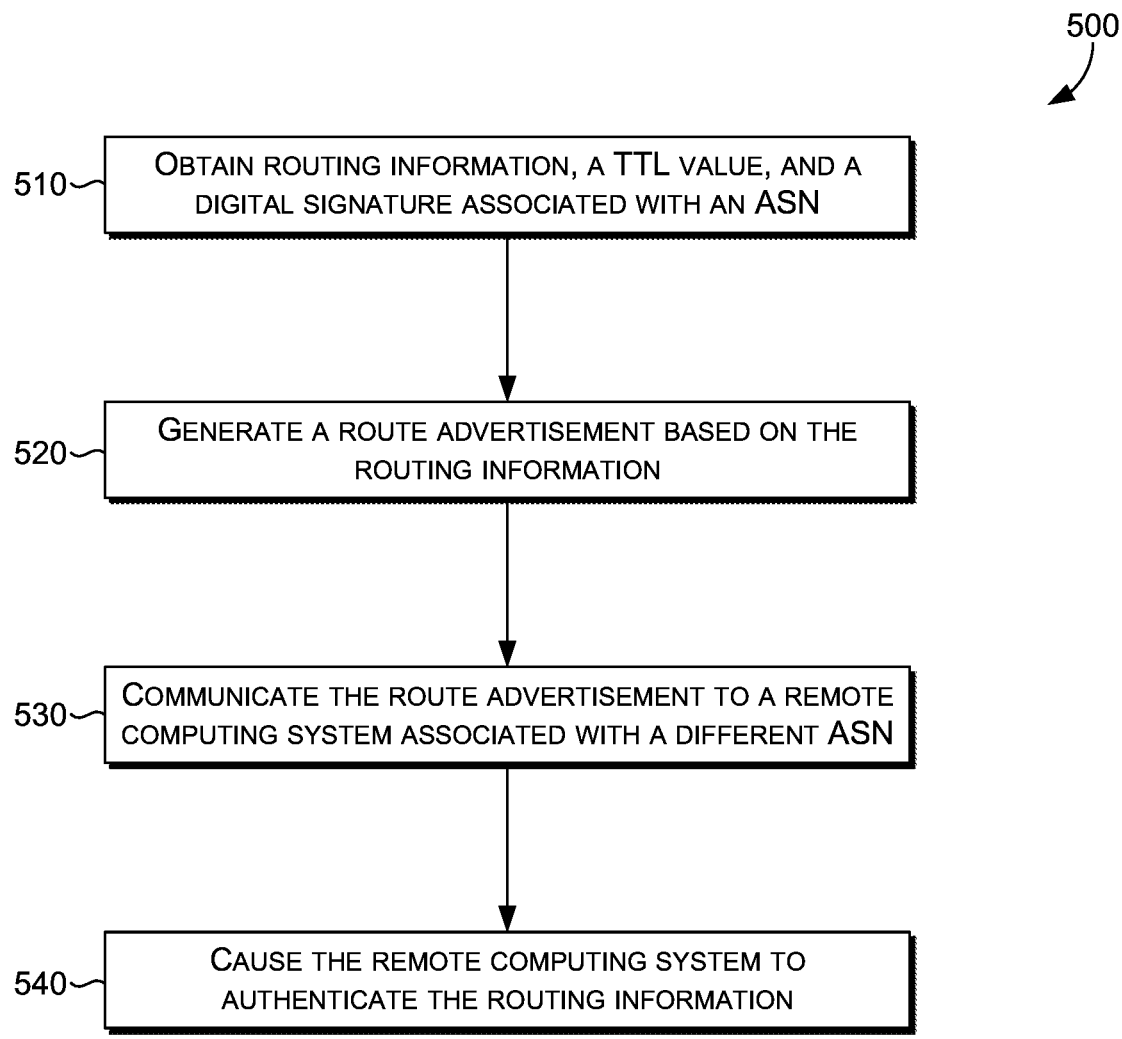
FIG. 5 is a flow diagram showing a method for propagating verifiable routing advertisements in accordance with some embodiments of the present invention.

Turning now to FIG. 5, a flow diagram is provided that illustrates a method for propagating verifiable routing advertisements to peer autonomous systems. As shown at block 510, a local computing device of an autonomous system (e.g., a router device 300 of FIG. 3) can obtain routing information, a TTL value, and a digital signature associated with the autonomous system. The routing information, TTL value, and/or digital signature can be retrieved directly from a computing device of a trusted authority (e.g., a secure BGP registry and certificate authority device 200 of FIG. 2), from a local caching server (e.g., a secure BGP caching server 400 of FIG. 4), or uploaded directly from a computer-readable medium, among other ways.

At block 520, the local computing device can generate a route advertisement based on the obtained routing information. The route advertisement can include therein the routing information, the TTL value, and the digital signature, among other things. At block 530, the local computing device can communicate the generated route advertisement to a remote computing device associated with a different autonomous system, like a different, remote, router device 300 of FIG. 3. The remote computing device can receive the route advertisement and determine that the route advertisement includes the routing information, digital signature, and TTL value, among other things. At block 540, the communication of the route advertisement and determination, by the remote computing device, that the route advertisement includes the routing information, digital signature, and TTL value, can cause the remote computing device to authenticate the routing information utilizing the digital signature and the TTL value. For instance, the remote computing device can extract a digital certificate and encrypted hash from the digital signature. The remote computing device can employ the digital certificate to determine that the digital signature is authentic, and that the routing information is valid. In this way, the remote computing device can update its routing table(s) or otherwise store the routing information, among other things, based on determining that the received route advertisement is authentic.

Figure 6:
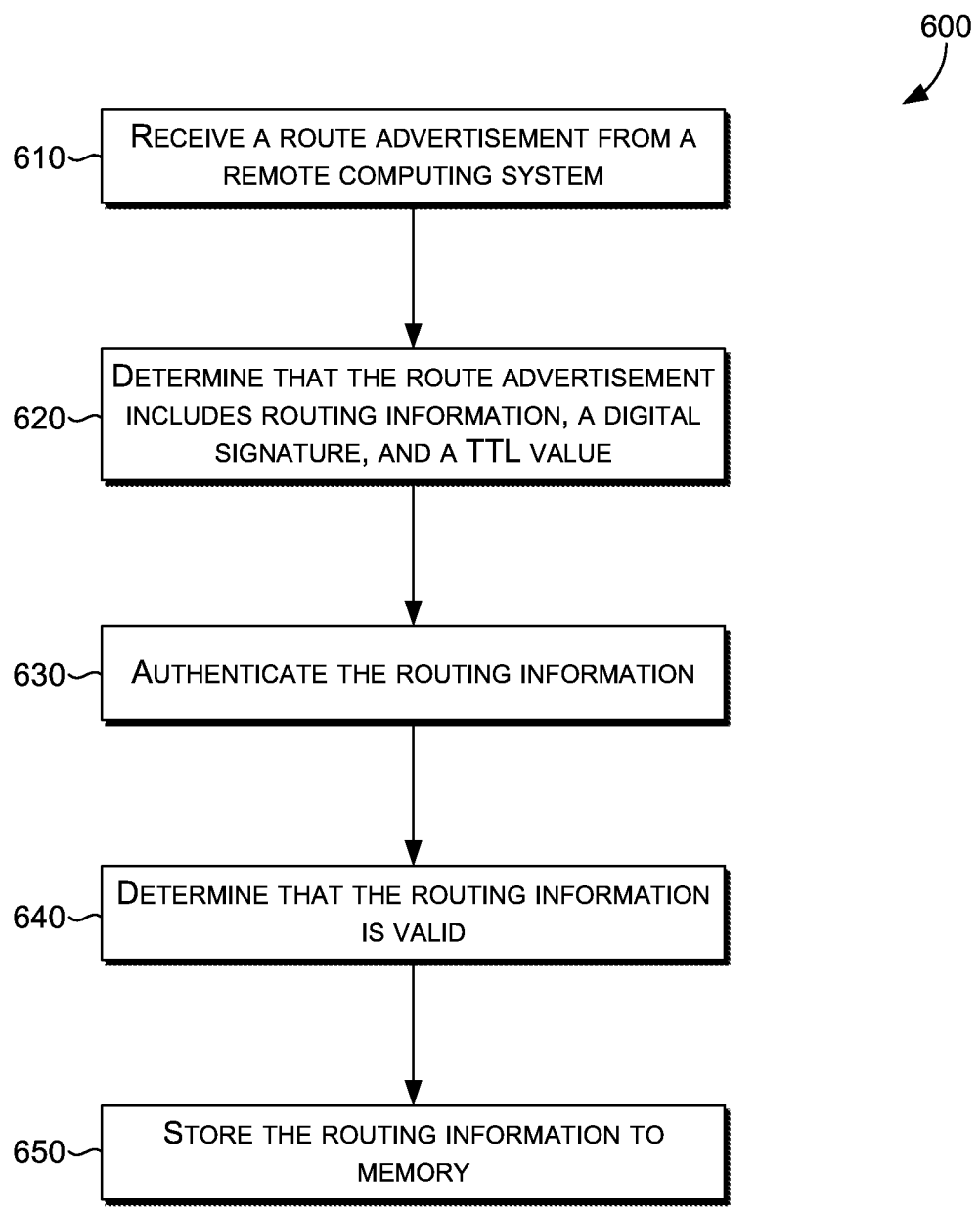
FIG. 6 is a flow diagram showing a method for authenticating and employing advertised routing information in accordance with some embodiments of the present invention.

Turning now to FIG. 6, a flow diagram is provided that illustrates a method for authenticating advertised routing information in order to update routing tables with confidence that the advertising routing information is valid. As shown at block 610, a local computing device of an autonomous system (e.g., a router device 300 of FIG. 3) can receive a route advertisement from a remote computing device (e.g., another router device 300 of FIG. 3) associated with a different autonomous system. In some embodiments, the local computing device can simply receive a route advertisement having routing information with no digital signature or TTL value (i.e., unauthenticated routing information). In this case, the local computing device may update its routing table(s) or otherwise store the routing information, though the routing information would not be considered authenticated. However, in some cases, at block 620, the local computing device can determine that the route advertisement includes, among other things, a set of routing information, a digital signature, and a TTL value. Based on the determination that the digital signature and TTL value are included with the routing information, the local computing device can, at block 630, authenticate the routing information based on the digital signature. As described herein, the local computing device can authenticate the routing information in a variety of ways. In one embodiment, a digital certificate and encrypted hash can be extracted from the digital signature. The digital certificate, issued by the trusted authority, can be verified by analyzing the digital certificate and verifying the authenticity of the digital certificate via the trusted authority (e.g., a secure BGP registry and certificate authority device 200 of FIG. 2) or via local caching server (e.g., a secure BGP caching server 400 of FIG. 4) in communication with the trusted authority. The digital certificate (e.g., a public key therein) can be employed by the local computing device to decrypt the encrypted hash. The local computing device can compare the decrypted hash with a hash of the received routing information to determine whether the routing information is authentic. If the decrypted hash and hash of the routing information match, the local computing device can determine that the routing information is authentic. In another embodiment, the local computing device can retrieve a digital certificate associated with the routing information (i.e., the autonomous system) from the trusted authority (e.g., a secure BGP registry and certificate authority device 200 of FIG. 2) or local caching server (e.g., a secure BGP caching server 400 of FIG. 4) in communication with the trusted authority. Similarly, the local computing device can compare the decrypted hash with a hash of the received routing information to determine whether the routing information is authentic. If the decrypted hash and hash of the routing information match, the local computing device can determine that the routing information is authentic. As is described in accordance with various embodiments of the present disclosure, the local computing device can extract the TTL value from the route advertisement and initiate a timer based on the TTL value. In other words, so long as the timer counting down from the TTL value is not expired, the authenticated routing information received with the TTL value is still determined valid and the local computing device can continue to utilize the authenticated routing information. However, if the timer has expired, the local computing device can determine that the authenticated routing information needs to be re-authenticated and/or refreshed. As such, at block 640, the local computing device can authenticate routing information associated with an autonomous system and determine that the routing information is still valid based on the TTL value. In some embodiments, if the routing information of an autonomous system has never been previously authenticated or validated, and the routing information is determined authentic, the TTL value can be utilized to start a timer and the authenticated routing information can be determined valid so long as the timer does not expire. Alternatively, if the routing information has been previously authenticated and validated, and the routing information is now once again determined authentic but the TTL timer from the prior authentication is now expired, then the prior routing information can be considered invalid and the new routing information can be stored as valid. In this regard, at block 650, the local computing device can store the authenticated set of routing information into a memory, such as a routing table or other storage device or object, based on determining that the routing information is valid.

Figure 7:
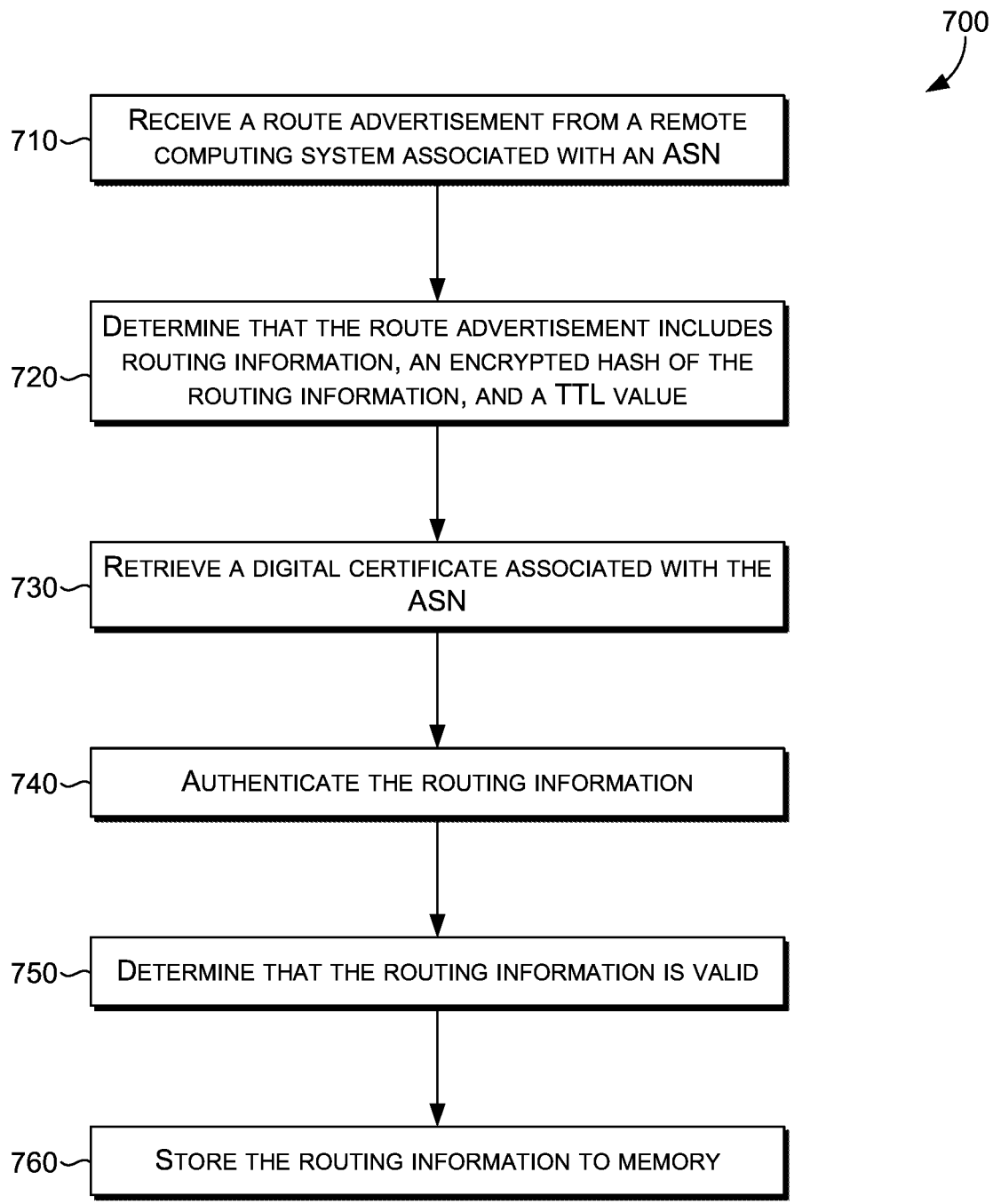
FIG. 7 is a flow diagram showing another method for authenticating and employing advertised routing information in accordance with some embodiments of the present invention.

Turning now to FIG. 7, a flow diagram is provided that illustrates another method for authenticating advertised routing information in order to update routing tables with confidence that the advertising routing information is valid. As shown at block 710, a local computing device of an autonomous system (e.g., a router device 300 of FIG. 3) can receive a route advertisement from a remote computing device (e.g., another router device 300 of FIG. 3) associated with a different autonomous system. In some embodiments, the local computing device can simply receive a route advertisement having routing information with only routing information. In this case, the local computing device may update its routing table(s) or otherwise store the routing information, though the routing information would not be considered authenticated or validated. However, in some cases, at block 720, the local computing device can determine that the route advertisement includes, among other things, a set of routing information, an encrypted hash of the routing information, and a TTL value. Based on the determination that the encrypted hash and TTL value are included with the routing information, the local computing device can, at block 730, retrieve a digital certificate associated with the autonomous system associated with the route advertisement. The digital certificate can be retrieved, for example, from a trusted authority (e.g., a secure BGP registry and certificate authority device 200 of FIG. 2) or a local caching server (e.g., a secure BGP caching server 400 of FIG. 4) in communication with the trusted authority. At block 740, the local computing device can authenticate the routing information based on the encrypted hash and the digital certificate. As described herein, the digital certificate, issued by the trusted authority, can be verified by analyzing the digital certificate and verifying the authenticity of the digital certificate via the trusted authority (e.g., a secure BGP registry and certificate authority device 200 of FIG. 2) or via local caching server (e.g., a secure BGP caching server 400 of FIG. 4) in communication with the trusted authority. The digital certificate (e.g., a public key therein) can be employed by the local computing device to decrypt the encrypted hash. The local computing device can compare the decrypted hash with a hash of the received routing information to determine whether the routing information is authentic. If the decrypted hash and hash of the routing information match, the local computing device can determine that the routing information is authentic. As is described in accordance with various embodiments of the present disclosure, the local computing device can extract a TTL value from the route advertisement and initiate a timer based on the TTL value. In other words, so long as the timer counting down from the TTL value is not expired, the authenticated routing information received with the TTL value is still determined valid and the local computing device can continue to utilize the authenticated routing information. However, if the timer has expired, the local computing device can determine that the authenticated routing information needs to be re-authenticated and/or refreshed. As such, at block 750, the local computing device can authenticate routing information associated with an autonomous system and further determine that the routing information is still valid based on the TTL value. In some embodiments, if the routing information of an autonomous system has never been previously authenticated or validated, and the routing information is determined authentic, the TTL value can be utilized to start a timer and the authenticated routing information can be determined valid so long as the timer does not expire. Alternatively, if the routing information has been previously authenticated and validated, and the routing information is now once again determined authentic but the TTL timer from the prior authentication is now expired, then the prior routing information can be considered invalid and the new routing information can be stored as valid. In this regard, at block 760, the local computing device can store the authenticated set of routing information into a memory, such as a routing table or other storage device or object, based on determining that the routing information is valid.

In any of the above-described embodiments, it is contemplated that a period of time may exist where not all autonomous systems have migrated over to the more, secured BGP route propagation and updating techniques described herein. Or, in some cases, certain rouge actors or non-compliant autonomous systems may choose not to implement any of the embodiments of the present disclosure. As such, there may be a period of time where certain autonomous systems are communicating route advertisements or sets of routing information that is not verifiable, as is typical in conventional systems. To this end, an autonomous system (e.g., a router device 300 of FIG. 3) can update its routing table or otherwise store received routing information regardless of whether the route advertisement in which routing information is received can be authenticated or not. In some embodiments, the autonomous system can employ a predefined rule that prefers authenticated routing information over unauthenticated routing information. In some cases, the autonomous system can have multiple sets of routing information from other autonomous systems, where none of it is authenticated or verifiable. In this regard, the autonomous system (e.g., the router device) can continue to employ all of the unauthenticated routing information—as in conventional systems—and begin replacing the unauthenticated routing information as newer, verifiable routing information is received and authenticated.

Figure 8:
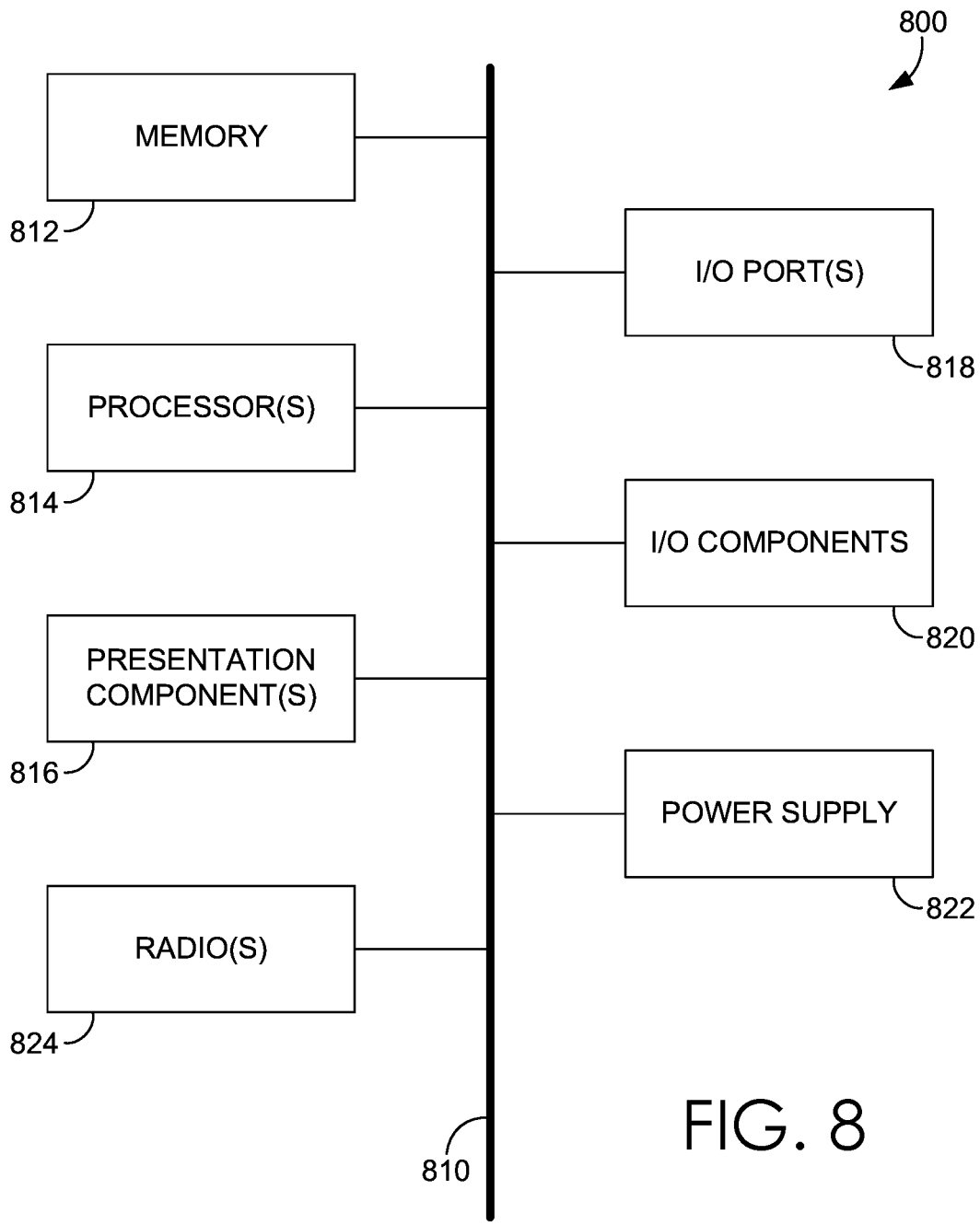
FIG. 8 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for, among other things, providing a more secure BGP protocol for autonomous systems. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized system, comprising:
one or more processors, and
one or more computer storage media storing computer-usable instructions that, when used by the one or more processors, cause the one or more processors to:
receive, from a remote computing device associated with a certification authority, a set of routing information assigned to an autonomous system number (ASN) associated with the computerized system, a time-to-live (TTL) value, and a digital signature for the set of routing information;
generate a route advertisement based on the set of routing information, the route advertisement including the TTL value and the digital signature;
communicate the route advertisement to a remote computing system associated with a different ASN; and
causing the remote computing system to authenticate the set of routing information based on the digital signature and the TTL value.

2. The system of claim 1, wherein the remote computing device is configured to define the set of routing information, the TTL value, and the digital signature in association with the ASN.

3. The system of claim 1, wherein to authenticate the set of routing information includes confirming, via the remote computing device, that the TTL value is not expired.

4. The system of claim 1, wherein to authenticate the set of routing information includes verifying the digital signature.

5. The system of claim 4, wherein verifying the digital signature includes
extracting an encrypted hash of the set of routing information and a public key from the digital signature;
employing the public key to decrypt the encrypted hash;
generating a new hash of the set of routing information; and
determining that the decrypted hash corresponds to the new hash.

6. A computer-implemented method for securing border gateway protocol (BGP) route propagation, the method comprising:
receiving, by a computerized system associated with an autonomous system number (ASN), a route advertisement from a remote computing system associated with a different ASN;
determining, by the computerized system, that the route advertisement includes a set of routing information, a digital signature for the set of routing information, and a TTL value, wherein the remote computing system is configured to receive the set of routing information, the digital signature, and the TTL value from a remote computing device associated with a certification authority;
authenticating, by the computerized system, the set of routing information based on the digital signature;
determining, by the computerized system, that the set of routing information is valid based on the TTL value; and
storing, by the computerized system, the authenticated set of routing information into a memory based on the determination that the set of routing information is valid.

7. The computer-implemented method of claim 6, wherein the remote computing device is configured to define the set of routing information, the TTL value, and the digital signature in association with the different ASN.

8. The computer-implemented method of claim 6, further comprising:
initiating, by the computerized system, a counter based on the TTL value, and
wherein the set of routing information is determined valid based on a determination that the counter is greater than zero.

9. The computer-implemented method of claim 8, wherein the counter is initiated in response to the set of routing information being authenticated.

10. The computer-implemented method of claim 6, wherein to authenticate the set of routing information includes:
extracting an encrypted hash of the set of routing information and a public key from the digital signature;
employing the public key to decrypt the encrypted hash;

generating a new hash of the set of routing information; and determining that the decrypted hash corresponds to the new hash.

11. The computer-implemented method of claim 6, further comprising:

retrieving, by the computerized system, the digital signature from the remote computing device, and wherein the set of routing information is authenticated based on the retrieved digital signature.

12. A non-transitory computer storage medium storing computer-useable instructions that, when used by one or more computing devices associated with an autonomous system number (ASN), cause the one or more computing devices to perform operations comprising:

receiving a route advertisement from a remote computing system associated with a different ASN;

determining that the route advertisement includes a set of routing information, an encrypted hash of the set of routing information, and a TTL value;

retrieving a digital certificate associated with the different ASN from a remote computing device associated with a certificate authority;

authenticating the set of routing information based on the encrypted hash and the digital certificate;

determining that the set of routing information is valid based on the TTL value; and storing the authenticated set of routing information based on the determination that the set of routing information is valid.

13. The medium of claim 12, wherein the remote computing system is configured to receive the set of routing information, the digital signature, and the TTL value from the remote computing device associated with the certification authority.

14. The medium of claim 12, wherein the remote computing device is configured to define the set of routing information, the TTL value, the encrypted hash, and the digital certificate in association with the different ASN.

15. The medium of claim 12, further comprising:

initiating a counter based on the TTL value, and wherein the set of routing information is determined valid based on a determination that the counter is greater than zero.

16. The medium of claim 15, wherein the counter is initiated in response to the set of routing information being authenticated.

17. The medium of claim 12, wherein to authenticate the set of routing information includes:

extracting a public key from the digital certificate, wherein the public key is associated with a private key employed to encrypt the hash of the set of routing information;

employing the public key to decrypt the encrypted hash;

generating a new hash of the set of routing information; and determining that the decrypted hash corresponds to the new hash.

18. The medium of claim 12, wherein the route advertisement further includes the digital certificate.

* * * * *